(12) United States Patent
Haller et al.

(10) Patent No.: US 6,302,003 B1
(45) Date of Patent: *Oct. 16, 2001

(54) METHOD AND APPARATUS FOR FEEDING SHAPED BAR STOCK

(75) Inventors: Dennis A. Haller, Washington Township; Mark W. Winkler, Harsens Island; John J. Saputo, Clinton Township, all of MI (US)

(73) Assignee: Ski Industries, Inc., Shelby Township, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/508,980

(22) PCT Filed: Sep. 17, 1998

(86) PCT No.: PCT/US98/19368

§ 371 Date: Mar. 17, 2000

§ 102(e) Date: Mar. 17, 2000

(87) PCT Pub. No.: WO99/14006

PCT Pub. Date: Mar. 25, 1999

Related U.S. Application Data

(63) Continuation-in-part of application No. 08/932,647, filed on Sep. 17, 1997, now Pat. No. 5,911,804.

(51) Int. Cl.[7] .............................. B23B 3/00; B23B 13/00; B23B 17/00
(52) U.S. Cl. ............................... 82/1.11; 82/124; 82/125; 82/126; 82/127
(58) Field of Search ........................... 82/1.11, 124, 125, 82/126, 127; 414/15–18; 29/38 B, 38 C

(56) References Cited

U.S. PATENT DOCUMENTS

| | | |
|---|---|---|
| 2,674,779 | 4/1954 | Herzog . |
| 3,072,269 | 1/1963 | Hillier . |
| 3,557,971 | 1/1971 | Tomiyama . |
| 3,664,215 | 5/1972 | Selby . |
| 3,874,519 | 4/1975 | Mikami . |
| 4,019,411 | 4/1977 | Bohn et al. . |
| 4,037,733 | 7/1977 | Doe et al. . |
| 4,068,545 | 1/1978 | Scheler . |
| 4,184,798 | 1/1980 | Laughlin . |
| 4,289,051 | 9/1981 | Ramunas . |
| 4,324,162 | 4/1982 | Uehara . |
| 4,596,170 | 6/1986 | Vandevori et al. . |
| 4,624,612 | 11/1986 | Geiser et al. . |
| 4,649,779 | 3/1987 | Juillerat . |
| 4,860,429 | 8/1989 | von Haas . |
| 4,914,993 | 4/1990 | Fabbri . |
| 4,998,455 | 3/1991 | Jauch . |
| 5,058,466 | 10/1991 | Fabbri . |
| 5,066,185 | 11/1991 | Cucchi . |
| 5,115,702 | 5/1992 | Link . |
| 5,140,878 | 8/1992 | Fabbri . |
| 5,320,008 | 6/1994 | Cucchi . |
| 5,326,210 | 7/1994 | Savage . |
| 5,456,146 | 10/1995 | Hubbard et al. . |
| 5,520,493 | 5/1996 | Cucchi . |
| 5,562,381 | 10/1996 | Cucchi . |
| 5,649,462 | 7/1997 | Cucchi . |

*Primary Examiner*—William Briggs
(74) *Attorney, Agent, or Firm*—Brooks & Kushman P.C.

(57) ABSTRACT

A bar stock loader (10) having a synchronizing head (16) for matching the flats of a fresh length of bar stock (14) with the flats of a remnent of bar stock (14') being machined in an automatic screw machine (12). The synchronizing head (16) has a selectively engageable drive controlled by a timing signal (66) that allows the fresh length of a bar stock (14) to be rotated at a speed approximately the speed of rotation of the remnant segment of bar stock (14'). A clutch (30) is provided for selectively interlocking a driven member (22) having a bushing (24) in which the fresh length of bar stock (14) is received to a bar stock engaging member (23) that is connected to the spindle (28) of the automatic screw machine. A method of loading bar stock is also disclosed.

13 Claims, 6 Drawing Sheets

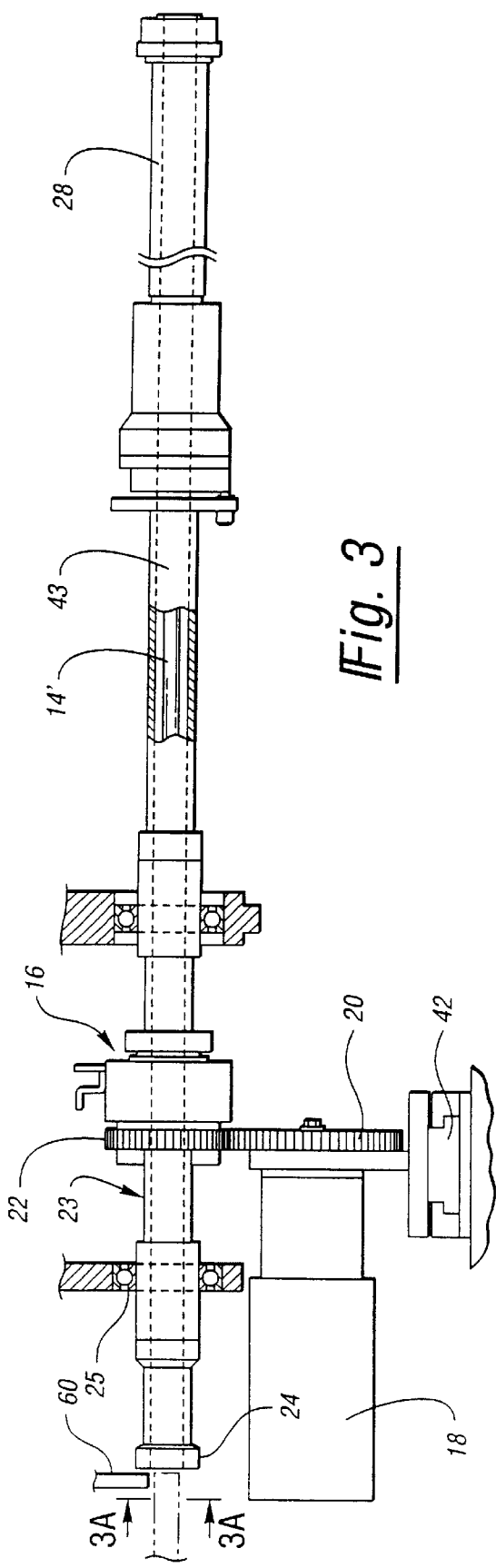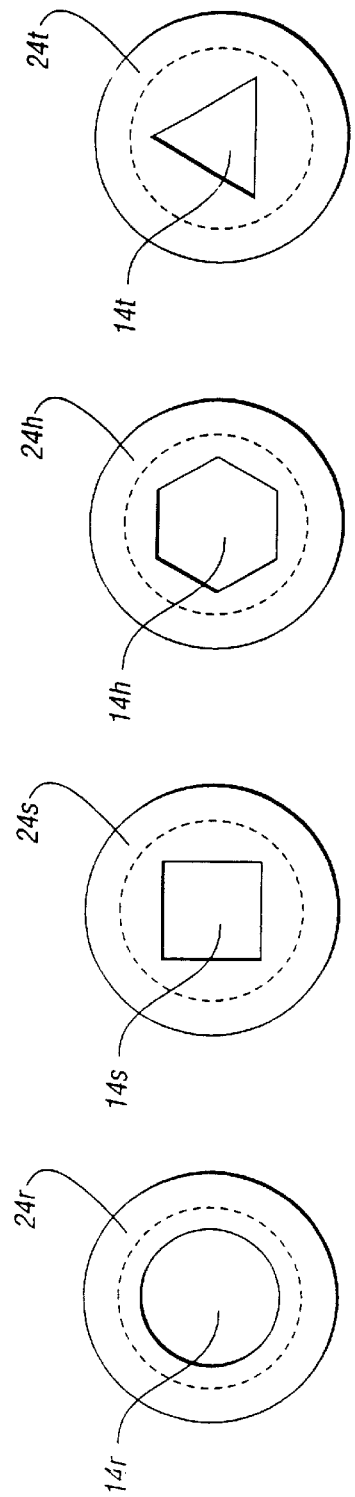

METHOD AND APPARATUS FOR FEEDING SHAPED BAR STOCK

Reference To Related Application

This application is related to U.S. Pat. application Ser. No. 08/932,647, filed Sep. 17, 1997, now U.S. Pat. 5,911,804, which is assigned to the assignee of the present invention.

TECHNICAL FIELD

The present invention relates to a bar stock loader for feeding shaped bar stock to an automatic spindle machine.

BACKGROUND ART

Bar stock loaders are used with automatic spindle machines having one or more spindles. Bar stock, generally from 8–12 feet in length, is fed from a magazine or hopper into a bar stock loader having bar stock retention members spaced along the length of the bar stock. In most instances, bar stock is cylindrical and requires no alignment between a bar being fed from the bar stock feeder to the automatic screw machine spindle as one segment of bar stock is depleted and a fresh length of bar stock is supplied to the spindle. The bar stock loader is typically arranged to automatically provide a new segment of cylindrical bar stock to the automatic screw machine without the need for direct operator control. Thus, when processing cylindrical bar stock, a single operator can generally supervise operation of several automatic spindle machines at the same time.

Shaped bar stock having a triangular, square, hex, or other cross-section offer important advantages over cylindrical bar stock in some applications. By using shaped bar stock, machining operations necessary to form flats, or flat surfaces, on a workpiece can be eliminated. By eliminating machining steps to form flats, labor requirements, cycle times and tooling costs can be reduced or additional processing steps may be added. However, conventional bar stock loaders required manual alignment of the flats of shaped bar stock with the flats of the bar stock in the automatic screw machine collet. Manual alignment increases labor requirements and reduces machine productivity. Other known arrangements have failed to overcome this deficiency.

For example, U.S. Pat. No. 3,664,215 discloses a machine tool having a spindle assembly operable to rotate non-circular bar stock about its longitudinal axis and a gripper assembly that engages a leading portion of the bar stock. The gripper is aligned with the chuck as the spindle is slowly rotated. This approach is slow and does not suggest synchronizing a fresh length of bar stock with a bar stock remnant at spindle operating speeds.

Similarly, U.S. Pat. No. 4,068,545 discloses an apparatus for feeding non-round cross-section bars to spindle machines. A feed apparatus detects the rotational speed of the chuck and generates a speed output when the rotational speed lies in a low speed range. When the spindle rotates within a desired range, the controller actuates an electromagnet to withdraw an abutment, thereby allowing movement of the bar stock.

U.S. Pat. No. 5,456,146 discloses a bar stock pre-alignment collar prior to chucking in a collet. A plurality of spring-loaded veliers are used to urge flats of the bar stock into a pre-alignment position.

Thus, while the above patents have addressed, in part, the problem of aligning flats on bar stock, none of the patents provides an acceptable system for automatically synchronizing the rotation of a fresh section of bar stock with a bar stock remnant in the spindle or collet of an automatic machine tool. The prior art approaches impede machine productivity and require substantial operator intervention and supervision.

The solution to the above problems and other objects and advantages achieved by the invention are summarized below.

SUMMARY OF THE INVENTION

According to the present invention, a bar stock loader for feeding shaped bar stock having one or more flats to an automatic spindle machine tool having one or more spindles includes a drive motor that is attached to a drive member which is selectively brought into engagement with a driven member. The driven member is attached to a bushing that grips a fresh section of bar stock fed by the bar stock loader. A bar stock engaging member is rotated by the spindle of the automatic screw machine. A clutch selectively connects the bar stock engaging member to the driven member. A signal generator associated with the spindle of the automatic screw machine produces a timing signal corresponding to the speed of rotation of the spindle. The drive motor is selectively driven in accordance with a timing signal to cause the drive member and driven member to rotate the bushing at a rotational speed approximating the speed of rotation of the spindle. An alignment locking mechanism is disposed between the driven member and the bar stock engaging member to align the flats of the fresh section of bar stock in the bushing with the flats of a remnant section of bar stock in the spindle. The flats of the fresh and remnant sections of bar stock are aligned prior to feeding the fresh section of bar stock through the bushing to the bar stock engaging member.

According to further features of the present invention as described above, the alignment locking element has two relatively rotatable members that have an interlock associated with both of the relatively rotatable members for locking the two members together in a radially aligned orientation. More particularly, the interlock may be at least one ball retained by one of the relatively rotatable members and a race defined by the other of the two relatively rotatable members. The race defines at least one ball seat for selectively receiving at least one ball when the flats of the fresh section of bar stock and the remnant section of bar stock are aligned.

According to another aspect of the present invention, the clutch may be a single position torque limiter having a pneumatically actuated clutch that disengages the bushing relative to the spindle when the remnant section of bar stock in the spindle is to be replaced by the fresh section of bar stock.

According to a preferred embodiment of the present invention, the bar stock feeding machine generates the timing signal with a digital tachometer indicating the speed of rotation of the machine tool spindle. The timing signal from the digital tachometer is provided to the drive motor, which is preferably a servomotor operated at a speed controlled by the digital tachometer signal.

According to another aspect of the present invention, a spindle interfacing assembly is provided between the automatic machine tool and the bar stock loader. The spindle interfacing assembly allows the bar stock loader to be retrofit to an existing automatic machine tool.

According to the method of the present invention, shaped bar stock is fed to an automatic spindle machine by first providing a length of bar stock to a bar stock loader. The bar stock in the bar stock loader is advanced to a bushing retained by a driven member. The driven member may be interlocked with a bar stock engaging member that is rotated with the spindle of the automatic screw machine. The driven member is selectively disengaged from the bar stock engaging member and rotated at a relatively slow rotational speed while the bar stock is advanced until a flat on the bar stock is matched to a flat on the bushing. This may be done while the bar stock engaging member is rotated at its machining speed. The bar stock is advanced through the bushing until a switch is actuated indicating that the bar stock is in the bushing and advanced to a predetermined preload position. The rotational speed of the driven member is then increased to rotate the bushing at a speed approximating the speed of rotation of the bar stock engaging member. The driven member and bar stock engaging member are then rotated relative to one another until a positioning element disposed between the driven member and the bar stock engaging member lock them together. When locked together, the flats on the bar stock in the bushing are aligned with the flats on a remnant section of bar stock in the bar stock engaging member. The fresh bar stock is then advanced with the bar stock remnant through the bar stock engaging member to the collet of the automatic screw machine.

According to another aspect of the method of the present invention, the step of disengaging the driven member from the bar stock engaging member further comprises supplying compressed air to a single position torque limiter.

According to another aspect of the method of the present invention, the step of increasing rotational speed of the driven member is continued until the rotational speed of the driven member is within one to five revolutions per minute of the rotational speed of the bar stock engaging member.

Finally, according to another aspect of the method of the present invention, the positioning element is a ball retained between the driven member and the bar stock engaging member in a race formed on either the driven member or the bar stock engaging member. The ball is received in a ball seat formed in the race when the flats on the bar stock in the bushing are aligned with the flats on the remnant section of bar stock in the bar stock engaging member.

These and other aspects of the present invention will be better understood in view of the drawings and the following detailed description of the invention.

BRIEF DESCRIPTION OF THE DRAWINGS

FIG. 3 is a front elevational view of the bar stock drive mechanism and spindle interface assembly;

FIGS. 3A–3D are end elevational views of bushings that are inserted into the driven member;

BEST MODE FOR CARRYING OUT THE INVENTION

Figure 1:
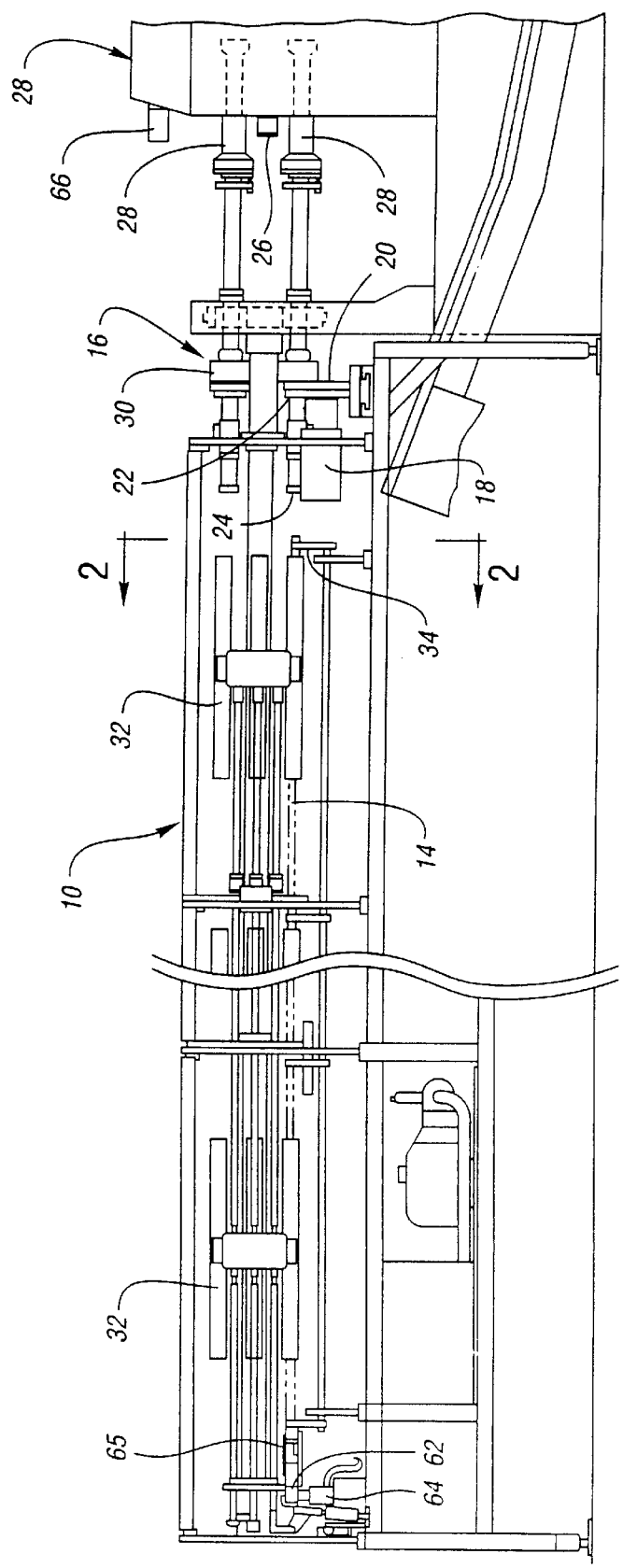
FIG. 1 is a front elevation view of the bar stock loader of the present invention with a fragmentary view of an automatic spindle machine tool.

Referring now to FIG. 1, a bar stock loader, generally indicated by reference numeral 10, is shown in conjunction with an automatic spindle machine tool, generally indicated by reference numeral 12. The bar stock loader 10 functions to load bar stock 14 into the automatic machine tool 12 as will be more particularly described below. The bar stock loader 10 features a synchronizing head, generally indicated by reference numeral 16, that functions to match flats found on bar stock 14 with flats formed on a remnant of bar stock (not shown in FIG. 1) being operated upon in the automatic screw machine 12.

The synchronizing head 16 is more fully described below. A drive motor 18, which may be either a stepper motor or servo motor, is operatively connected to a drive gear 20, or drive member, that in turn engages a driven member formed as a gear 22 integrated with a tube member 23. Turning or driving of gear 22 causes member 23 to rotate. A bushing 24 is secured to the end of member 23 for receiving bar stock into the tube. A bearing 25 rotatably supports tube 23.

Drive motor 18 receives a signal from a tachometer 26, or other signal generator, that provides a signal representative of the speed of rotation of a spindle 28 of the automatic machine tool 12.

A single position torque coupling 30, or clutch and gear set, is used to selectively couple bar stock 14 in the bar stock loader 10 to remnants of bar stock 14' in the automatic machine tool 12.

Bar stock loader 10 preferably includes clam shell bar retainers 32 that retain bar stock 14 while allowing for rotation of the bar stock 14. When one of the stations of the bar stock loader 10 is empty, a loader arm 34 operates to position a length of bar stock 14 within the clam shell bar retainers 32. The construction of the bar stock loader is more specifically described in application Ser. No. 059,884, filed Apr. 25, 1997, and is incorporated herein by reference.

Figure 2:
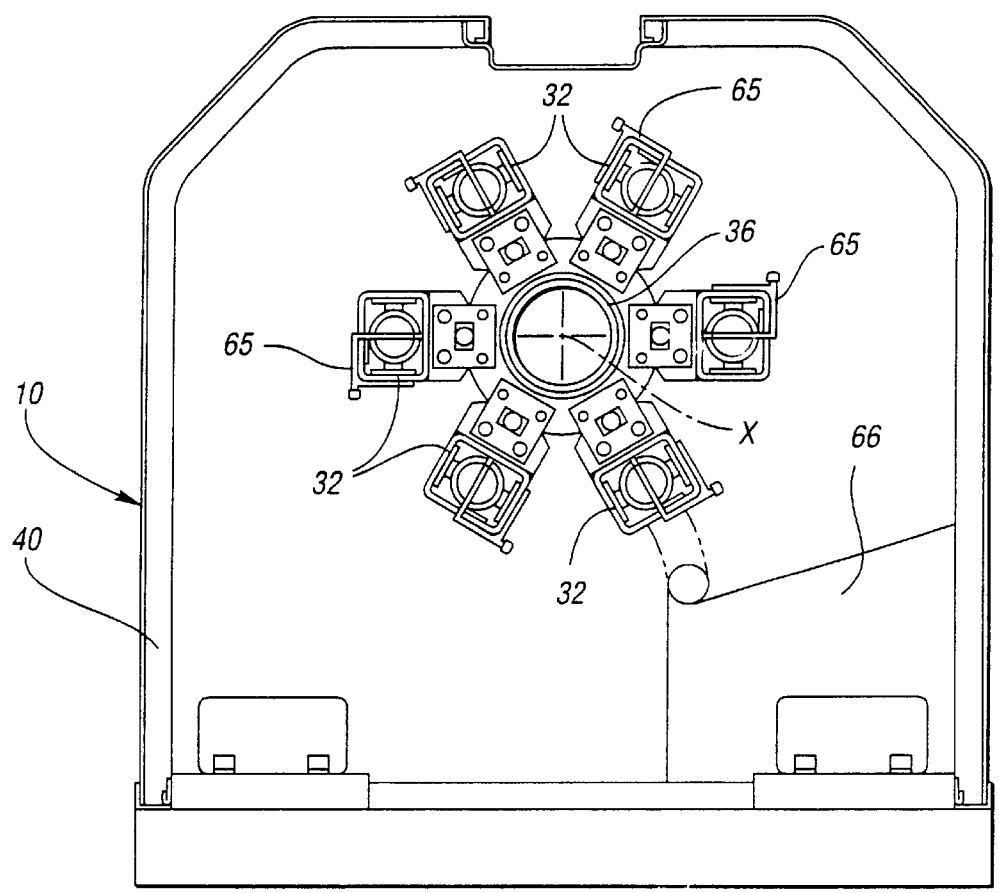
FIG. 2 is a cross-sectional view taken along the line 2—2 in FIG. 1.

Referring now to FIG. 2, the bar stock loader 10 is shown to include a drum 36 that is rotated about an axis X in tandem with the spindles 28 of the automatic screw machine 12 as the automatic screw machine indexes between positions. For illustrative purposes, the bar stock loader shows the clam shell bar retainers 32 as having six positions, and would be appropriate for a six spindle automatic spindle machine. However, such an arrangement is not to be construed as limiting as the present invention can be readily modified so as to be applicable to automatic screw machines having 1 to 8 spindles. A housing 40 is preferably provided to wholly or partially enclosed the drum 36 and clam shell bar retainers 32 of the bar stock loader 10.

Referring to FIG. 3, drive motor 18 drives the drive gear 20. Operation of the synchronizing head 16 is controlled by drive motor 18 via drive gear 20, which are mounted on a drive gear engagement slide 42 that allows the drive gear to selectively engage and disengage the driven gear 22.

The interfacing assembly 43 provides a mechanical interface between the spindle 28 and the synchronizing head 16.

Referring to FIGS. 3A through 3D, the bushing 24 is shown in various forms. For example, in FIG. 3A, a round bushing $24^r$ is shown. FIG. 3B shows a square bushing $24^s$. FIG. 3C shows a hexagonal bushing $24^h$ and FIG. 3D shows a triangular bushing $24^t$. Triangular bar stock $14^t$ is received within triangular bushing $24^t$. Square bar stock $14^s$ is received within square bushing $24^s$. Hexagonal bar stock $14^h$ is received within hexagonal bushing $24^h$. Round bar stock $14^r$ is received within round bushing $24^r$.

Figure 4:
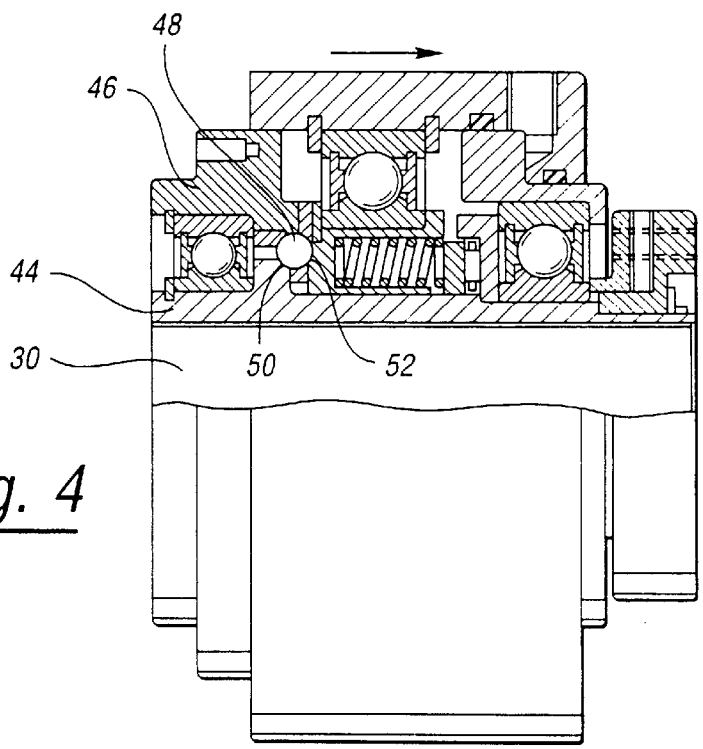
FIG. 4 is a partial cross-sectional view of the single position torque limiter.

Referring now to FIG. 4, the single position torque limiter 30 is shown in cross-section. A first rotatable member 46 is secured to the driven gear 22. A second rotatable portion 44 is secured to the spindle interface assembly 43 and is rotated along with the spindle 28. A ball clutch element 48 is received in ball seat 50 to lock the first and second rotatable members 44 and 46 together. When the ball clutch element 48 is not in the ball seat 50, it is rotatable on a spring-loaded pressure ring 52 located between the first and second rotatable members 44 and 46.

Synchronizing head 16 may alternatively include a single-position, air-operated clutch and serrated timing coupling (not shown). The air-operated clutch operates to engage and disengage the serrated timing coupling so that the bar stock 14' in the spindle 28 of the automatic screw machine 12 can be rotated separately from bar stock 14 supplied to the bushing 24.

Referring now to FIG. 3, a bar position switch 60, which may be a proximity switch of conventional design, is provided adjacent the bushing 24 to indicate whether a bar 14 is in position adjacent the bushing 24.

As shown in FIGS. 1 and 3, a ram 62 is provided to engage the end of the bar stock 14 and shift it through the bar stock loader 10 toward the automatic screw machine 12. Ram 62 is provided with a ram drive 64. Ram drive 64 may be either a hydraulic drive or a mechanical chain drive with a pusher 65 that is designed to engage the bar stock 14.

A cam switch 66 is provided on the automatic screw machine 12 to sense the status of the automatic screw machine cycle.

An escapement 68 is provided on the loader 10 to retain a bank of bar stock 14 to be loaded into the loader by the lifter 34.

Figure 5A:
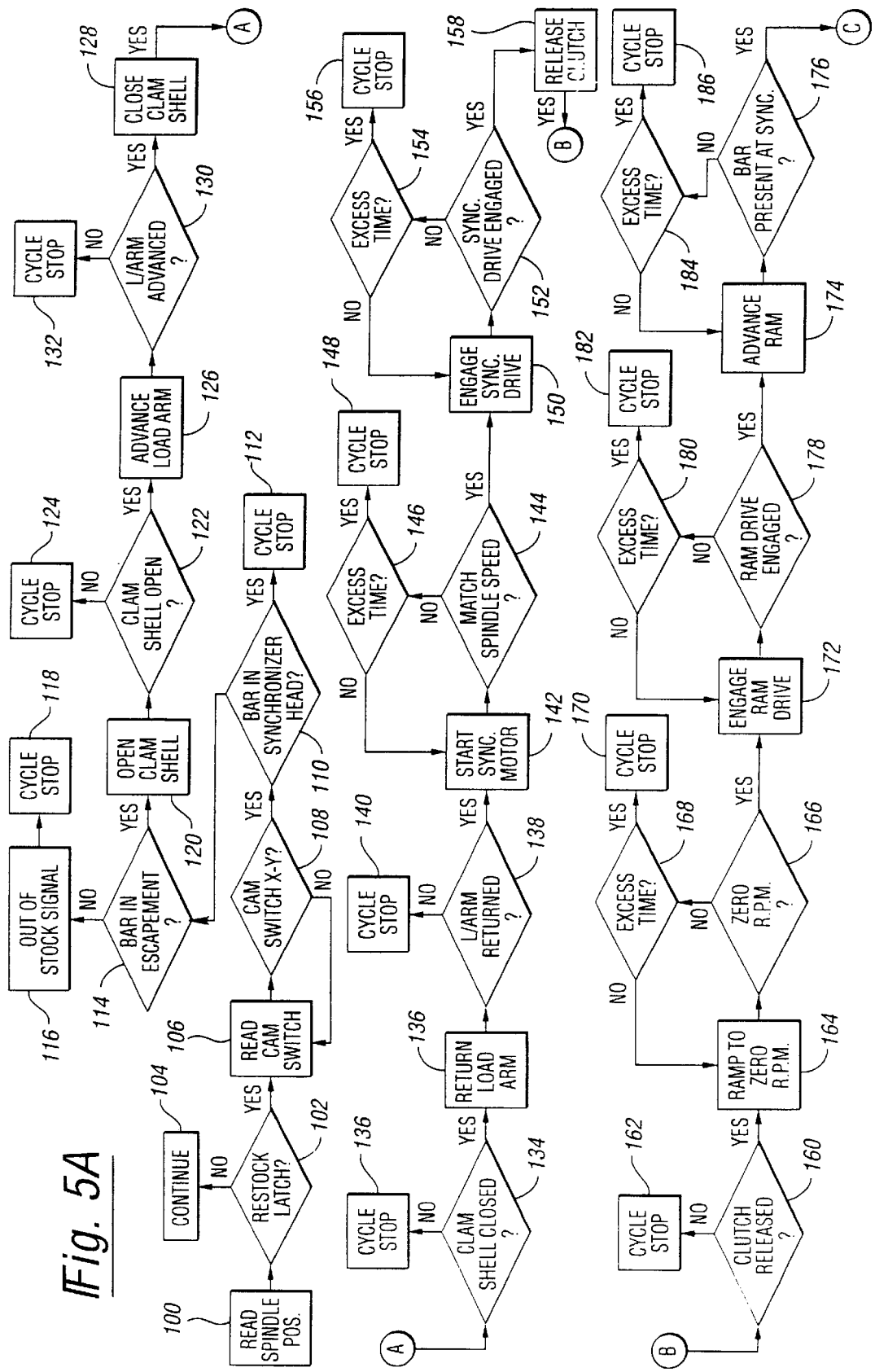
FIGS. 5A and 5B are flowcharts illustrating the sequence of operation of the synchronizing system bar stock loader as used in accordance with the present invention.
Figure 5B:
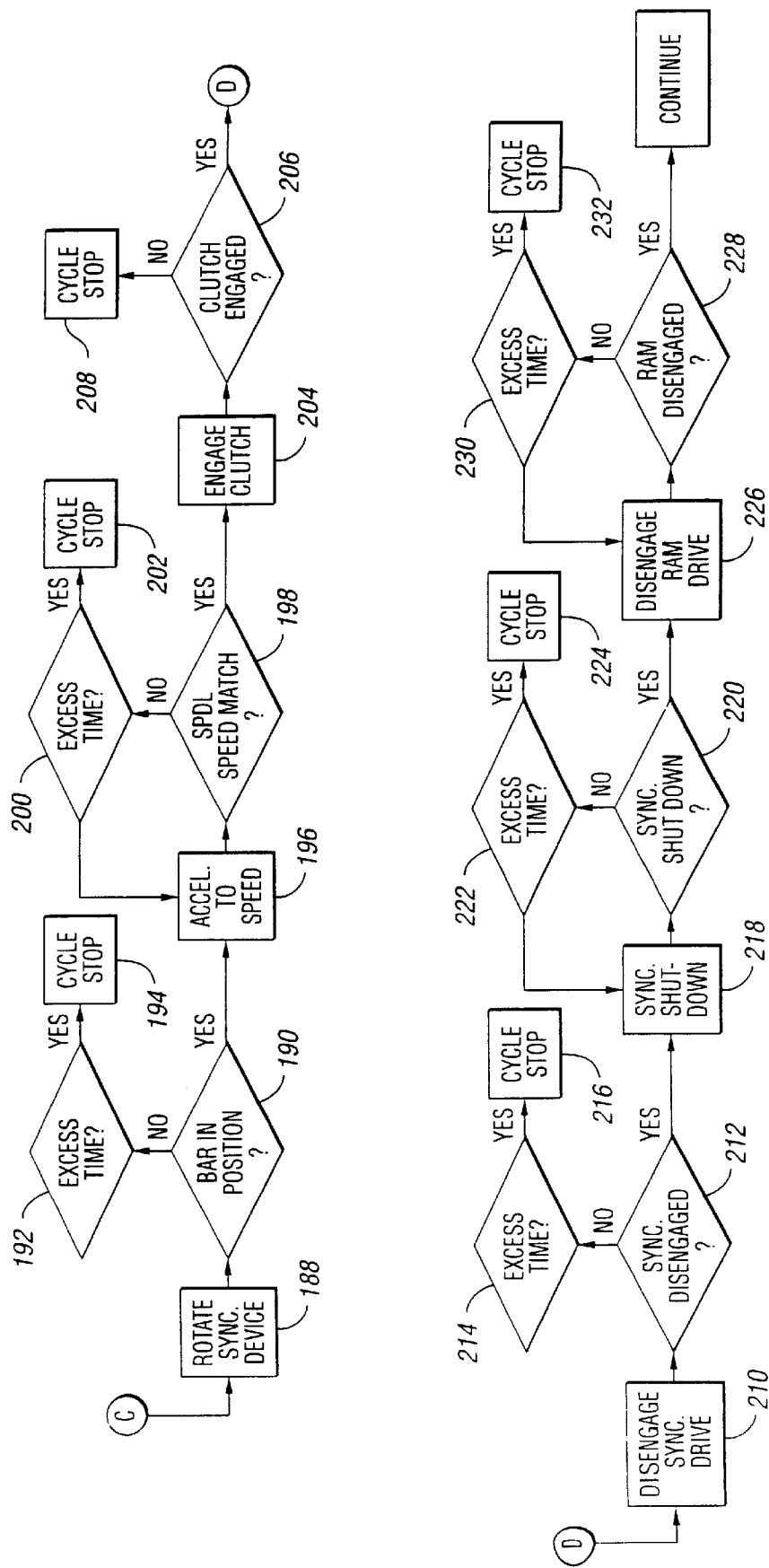

Referring now to FIGS. 5A and 5B, the sequence of operation of the synchronizing system will be described in detail. The operation is explained in reference to a "sixth" position of the bar stock loader with a six position automatic screw machine where the loading of new bar stock is typically accomplished. A "first" position operation is also described below in context with FIG. 6.

At block 100, the system first reads the spindle position to verify that the spindle is in position number 6. The control system of the automatic machine spindle is generally responsive to a restock latch when in a restock cycle. As shown at blocks 102 and 104, if the spindle 28 does not require restocking, operation of the machine continues. If the restock latch indicates that it is necessary to restock the bar stock 14, the cam switch 66 is read at block 106 to determine if the cam switch is indicating that the cam is within a predetermined range of positions X to Y. As shown at decision block 108, if a number within the range x to y is not indicated, the cam switch 66 is read again.

If the cam switch 66 is within the X to Y range, then at block 110 the system checks to determine whether a bar 14 is in the synchronizer head 16. If a bar 14 is in the synchronizer head 16, the cycle stops as shown at block 112. If there is no bar 14 in the synchronizer head 16, then at block 114 it is determined whether there is a bar 14 in the escapement 68. If there are no bars in the escapement 68, the system provides an out-of-stock signal to the operator and the cycle stops as shown at blocks 116 and 118.

However, if a bar 14 is present in the escapement 68, the bar stock loader 10 opens the clam shell 32 at block 120. If the clam shell 32 fails to open as determined at block 122, then at block 124 the cycle stops. If the clam shell 32 opens, as indicated at blocks 126 and 128, the loader arm 34 lifts a bar into the clam shell 32 and the clam shell 32 is closed about the bar stock 14. As shown at blocks 130, 132, 134, and 136, the system stops the cycle if the loader arm does not advance or the clam shell does not close. Once the clam shell 32 is closed, the loader arm 34 returns as shown at block 136.

Otherwise, at block 42 the drive motor 18 is then started and speed of the motor 18 is ramped up to approximately match the speed of the spindle 28. As shown at blocks 144, 146, and 148, if the spindle speed is not reached within a predetermined period of time, the cycle will stop. When the spindle speed is matched, the synchronizing drive is engaged at block 150. As shown at blocks 152, 154, and 156, if the synchronizing drive does not engage within a predetermined period of time, the cycle will stop.

Once the synchronizing drive is engaged, the clutch of the single position torque coupling 30 is released at block 158. As indicated at blocks 160 and 162, if the clutch does not release, the cycle is stopped. Once the clutch is released, the speed of rotation of the synchronizing motor is ramped to 0 rpm at block 164. As shown at blocks 166, 168, and 170, if 0 rpm is not reached within a predetermined period of time, the cycle will stop.

As shown at block 172, when the synchronizing drive is stopped or at 0 rpm, the ram drive 64 is engaged to advance the ram 62 at block 174, which, in turn, drives the bar stock 14 until the bar is detected by the bar position switch 60 at block 176. As shown at blocks 178, 180, and 182, if the ram drive does not engage within a predetermined period of time, the cycle will stop, and at blocks 184, and 186, if a bar is not detected by the bar position switch 60 within a predetermined period of time, the cycle will stop.

When a bar 14 is sensed at the front of the synchronizing head 16, at block 188 the synchronizing head 16 is rotated at a slow rate of speed until the bar 14 is indicated to be in position within the bushing 24. If the bar does not reach the desired position within a predetermined period of time, the cycle will stop as indicated at blocks 190, 192, and 194.

The synchronizing drive then accelerates at block 196 until its speed of rotation in synchronized and approximately matches the speed of rotation of the spindle (preferably within one to five revolutions per minute relative to the speed of rotation of the spindle). As shown at blocks 198, 200, and 202, the cycle will be stopped if the speed does not match within a predetermined period of time. When a speed match is achieved, the clutch or single position torque coupling 30 is engaged as shown at block 204. The cycle will be stopped if the clutch does not engage within a predetermined period of time, as indicted by blocks 206, and 208.

Once the clutch or single position torque coupling 30 is engaged, the synchronizer head 16 is disengaged at block 210 by shifting the drive motor 18 on the slide 42. The cycle will be stopped if the clutch does not engage within a predetermined period of time, as shown at blocks 212, 214, and 216. When the synchronizing head is disengaged, the synchronizing drive shuts down at block 218. As shown at blocks 220, 222, and 224, if the synchronizing drive does not shut down within a predetermined period of time, the cycle will stop. Upon shut down of the synchronizing drive, the ram drive 64 is disengaged at block 226 and the ram 62 disengages the bar stock 14. If the ram does not disengage within a predetermined period of time, the cycle will stop as shown at blocks 228, 230, and 232. Otherwise, at this point, the rotation and advancement of the bar stock 14 is controlled by the spindle 28 of the automatic screw machine 12.

Figure 6:
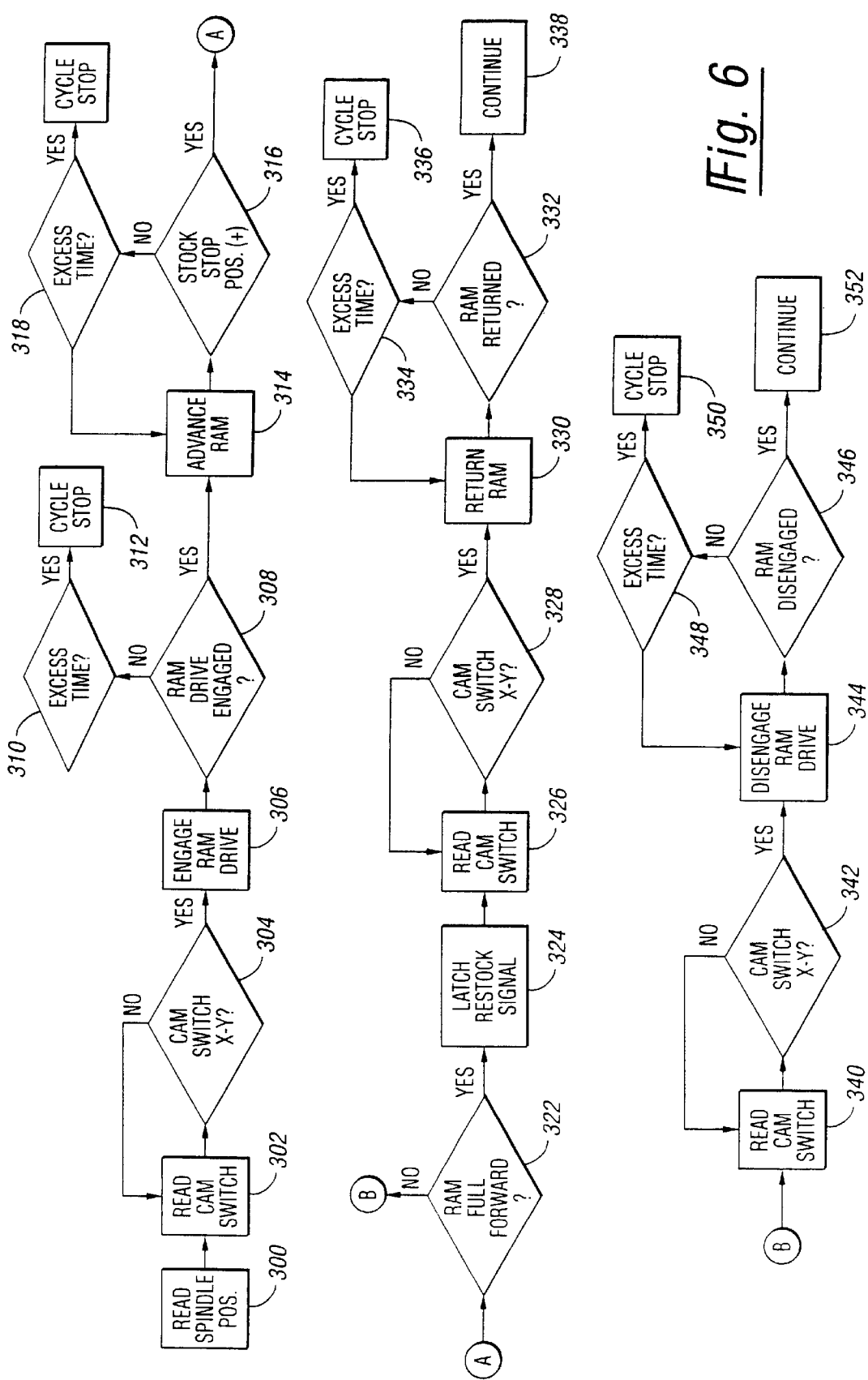
FIG. 6 is a flowchart illustrating the sequence of operation of the bar stock loader of the present invention when in a first position.

Referring now to FIG. 6, a flowchart illustrates the sequence of operation for setting the restock latch when a bar 14 is in a "first position" as detected by reading the spindle position as indicated at block 300. Once first position is detected, the cam switch 66 is read at block 302 to determine if the cam switch is indicating that the cam is within a predetermined range of positions X to Y. As shown at decision block 304, if a number within the range x to y is not indicated, the cam switch 66 is read again.

If the can switch 66 is within the X to Y range, then at block 306 the system engages the ram drive 64. As shown at blocks 308, 310, and 312, if the ram drive does not engage within a predetermined period of time the cycle will be stopped. Otherwise, the ram is advanced at block 314 until the bar contacts a stock stop switch as indicated at block 316. As shown at blocks 318 and 320, if the bar does not contact the stock stop switch within a predetermined period of time, the cycle is stopped.

Once the bar contacts the stock stop switch, the system determines whether the ram is all the way forward at block 322. If the ram is all the way forward, then the restock latch is set at block 324. At block 326, the cam switch 66 is read to determine if the cam switch is indicating that the cam is within a predetermined range of positions X to Y. As shown at decision block 328, if a number within the range x to y is not indicated, the cam switch 66 is read again.

If the cam switch 66 is within the X to Y range, then at block 330 the ram is returned to an initial position. As shown at blocks 332, 334, and 336, if the ram does not return within a predetermined period of time, the cycle will be stopped. Otherwise, the process continues as shown at block 338.

If the ram is detected at block 322 as not being all the way forward, then at block 340 the cam switch 66 is read to determine if the cam switch is indicating that the cam is within a predetermined range of positions X to Y. As shown at decision block 342, if a number within the range X to Y is not indicated, the cam switch 66 is read again. If the cam switch 66 is within the X to Y range, then at block 344 the ram drive is disengaged. As shown at blocks 346, 348, and 350, if the ram drive does not disengage within a predetermined period of time, the cycle will stop. Otherwise, the process continues as shown at block 352.

The preceding description of the bar stock loader and its method of operation is a description of a preferred embodiment. The above disclosure is intended to be understood as an example and should not be read in a limiting sense. The broad scope of the present invention is to be construed by reference to the following claims.

What is claimed is:

1. An automatic spindle machine tool for machining bar stock including a bar stock feeding apparatus for feeding bar stock to the automatic spindle machine tool, the automatic spindle machine tool having at least one spindle, the bar stock having at least one flat;
   a bar stock engaging member;
   a bar stock loader;
   a drive motor;
   a drive member attached to the drive motor;
   a driven member selectively engaged by the drive member and attached to a bushing that is adapted to grip a fresh section of bar stock in the bar stock loader;
   means for generating a timing signal corresponding to the speed of rotation of the spindle;
   said drive motor being selectively driven in accordance with the timing signal to cause the drive member and driven member to be synchronized whereby the bushing is rotated at a rotational speed approximating the speed of rotation of the spindle; and
   an alignment locking element located between the driven member and the bar stock engaging member for aligning the fresh section of bar stock in the bushing with a remnant section of bar stock in the spindle to align the flats of the fresh and remnant sections of bar stock prior to feeding the fresh section of bar stock through the bushing to the bar stock engaging member.

2. The automatic spindle machine tool of claim 1 wherein the alignment locking element has two relatively rotatable members that have an interlock associated with both of the relatively rotatable members for locking the two relatively rotatable members together in a radially aligned orientation.

3. The automatic spindle machine tool of claim 2 wherein the interlock includes at least one ball retained by one of said relatively rotatable members and a race defined by the other of the two relatively rotatable members, said race having at least one ball seat for selectively receiving the at least one ball when the flats of the fresh section of bar stock and the remnant section of bar stock are aligned.

4. The automatic spindle machine tool of claim 1 wherein the alignment locking element is a single position torque limiter having a clutch that disengages the bushing relative to the spindle when the remnant section of bar stock in the spindle is to be replaced by the fresh section of bar stock.

5. The automatic spindle machine tool of claim 1 wherein the automatic spindle machine tool has 6 spindles.

6. The automatic spindle machine tool of claim 1 wherein said timing signal is a digital tachometer signal indicating the speed of rotation of the machine tool spindle.

7. The automatic spindle machine tool of claim 6 wherein the drive motor is a servo motor operated at a speed controlled by the digital tachometer signal.

8. The automatic spindle machine tool of claim 1 wherein the drive member is a drive gear and the driven member is a driven gear.

9. The automatic spindle machine tool of claim 1 wherein the bar stock engaging member is a spindle interfacing assembly.

10. A method for feeding shaped bar stock to an automatic spindle machine tool having a bar stock engaging member including a collet rotatable with the spindle of the automatic machine tool, comprising:
    providing a length of bar stock to a bar stock loader, the length of bar stock having at least one flat;
    advancing the bar stock to a bushing retained by a driven member that is selectively interlocked with the bar stock engaging member;
    disengaging the driven member from the bar stock engaging member;
    rotating the driven member at a relatively slow rotational speed while the bar stock is advanced until the flat on the bar stock is matched to a flat on the bushing;
    advancing the bar stock through the bushing until a switch is actuated indicating that the bar stock is in the bushing and advanced to a predetermined position;
    synchronizing the rotational speed of the driven member with respect to the rotational speed of the bushing whereby the speed of the driven member approximates the speed of rotation of the bar stock engaging member;
    coupling together the driven member and the bar stock engaging member as they are rotated relative to one another until a positioning element operatively disposed between the driven member and the bar stock engaging member locks the driven member and the bar stock engaging member together with the flat on the bar stock in the bushing being aligned with a flat on a remnant section of bar stock in the bar stock engaging member; and advancing the bar stock through the bar stock engaging member to the collet of the automatic spindle machine tool.

11. The method of claim 10 wherein the step of disengaging the driven member from the bar stock engaging member further comprises supplying compressed air to a single position torque limiter.

12. The method of claim 10 wherein said step of synchronizing the rotational speed of the driven member is continued until the rotational speed of the driven member is within one to five revolutions per minute of the rotational speed of the bar stock engaging member.

13. The method of claim 12 wherein said positioning element is a ball retained between the driven member and the bar stock engaging member in a race formed on at least one of said driven member and said bar stock engaging member, and wherein said ball is received in a ball seat formed in the race when the flats on the bar stock in the bushing are aligned with the flats on the remnant section of bar stock in the bar stock engaging member.

* * * * *